United States Patent
Shen et al.

(10) Patent No.: US 8,111,731 B2
(45) Date of Patent: Feb. 7, 2012

(54) BLOCK SCRAMBLING FOR ORTHOGONAL FREQUENCY DIVISION MULTIPLE ACCESS

(75) Inventors: Zukang Shen, Richardson, TX (US); Tarik Muharemovic, Dallas, TX (US)

(73) Assignee: Texas Instruments Incorported, Dallas, TX (US)

( * ) Notice: Subject to any disclaimer, the term of this patent is extended or adjusted under 35 U.S.C. 154(b) by 924 days.

(21) Appl. No.: 12/061,878

(22) Filed: Apr. 3, 2008

(65) Prior Publication Data
US 2008/0247477 A1 Oct. 9, 2008

Related U.S. Application Data

(60) Provisional application No. 60/910,126, filed on Apr. 4, 2007.

(51) Int. Cl.
*H04B 1/00* (2006.01)

(52) U.S. Cl. .......... 375/130; 380/252; 380/268
(58) Field of Classification Search ........... 375/130, 375/146; 380/37, 42, 252, 255, 286, 287
See application file for complete search history.

(56) References Cited

U.S. PATENT DOCUMENTS

| | | | | |
|---|---|---|---|---|
| 6,363,107 | B1 * | 3/2002 | Scott | 375/150 |
| 6,922,406 | B2 * | 7/2005 | Rudolf et al. | 370/350 |
| 6,930,996 | B2 * | 8/2005 | Rudolf et al. | 370/350 |
| 7,539,263 | B2 * | 5/2009 | Jung et al. | 375/267 |
| 7,551,598 | B2 * | 6/2009 | Rudolf et al. | 370/350 |
| 7,616,622 | B2 * | 11/2009 | Rudolf et al. | 370/350 |
| 7,944,980 | B2 * | 5/2011 | Qu et al. | 375/260 |
| 2006/0056528 | A1 * | 3/2006 | Jung et al. | 375/260 |
| 2007/0097942 | A1 * | 5/2007 | Gorokhov et al. | 370/342 |
| 2008/0014979 | A1 * | 1/2008 | Gorokhov et al. | 455/522 |

* cited by examiner

*Primary Examiner* — Jean B Corrielus
(74) *Attorney, Agent, or Firm* — Robert D. Marshall, Jr.; W. James Brady; Frederick J. Telecky, Jr.

(57) ABSTRACT

A method of transmitting signals in a communication system over at least two time periods including generating a base signal comprising of at least two samples in each time period, selecting a scrambling sequence of length equal to or greater than the number of time periods, scaling all samples in said signal in a time period with one element of said scrambling sequence and transmitting the scaled signal in said time period. Different elements of the scrambling sequence are used to scale the base signal in different time periods. The signal in each time period is obtained by scaling a base signal. The scrambling sequence is preferably a pseudo-random sequence. The step of scaling all samples in said signal in a time period consists of multiplying all samples of said signal with an element of said scrambling sequence.

24 Claims, 8 Drawing Sheets

US 8,111,731 B2

BLOCK SCRAMBLING FOR ORTHOGONAL FREQUENCY DIVISION MULTIPLE ACCESS

CLAIM OF PRIORITY

This application claims priority under 35 U.S.C. 119(e)(1) to U.S. Provisional Application No. 60/910,126 filed Apr. 4, 2007.

TECHNICAL FIELD OF THE INVENTION

The technical field of this invention is wireless telephone communication, particularly Evolved-UMTS Radio Access (E-UTRA) communication.

BACKGROUND OF THE INVENTION

As wireless systems proliferate, the expanding user base and the demand for new services necessitate the development of technologies capable of meeting users' ever increasing expectations. Users of mobile telecommunications devices expect not only globally available reliable voice communications but a variety of data services, such as email, text messaging and internet access.

SUMMARY OF THE INVENTION

A method of transmitting signals in a communication system over at least two time periods including generating a base signal comprising of at least two samples in each time period, selecting a scrambling sequence of length equal to or greater than the number of time periods, scaling all samples in the signal in a time period with one element of the scrambling sequence and transmitting the scaled signal in the time period. Different elements of the scrambling sequence scale the base signal in different time periods. The signal in each time period is obtained by scaling a base signal. The scrambling sequence is preferably a pseudo-random sequence. The step of scaling all samples in the signal in a time period consists of multiplying all samples of the signal with an element of the scrambling sequence.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
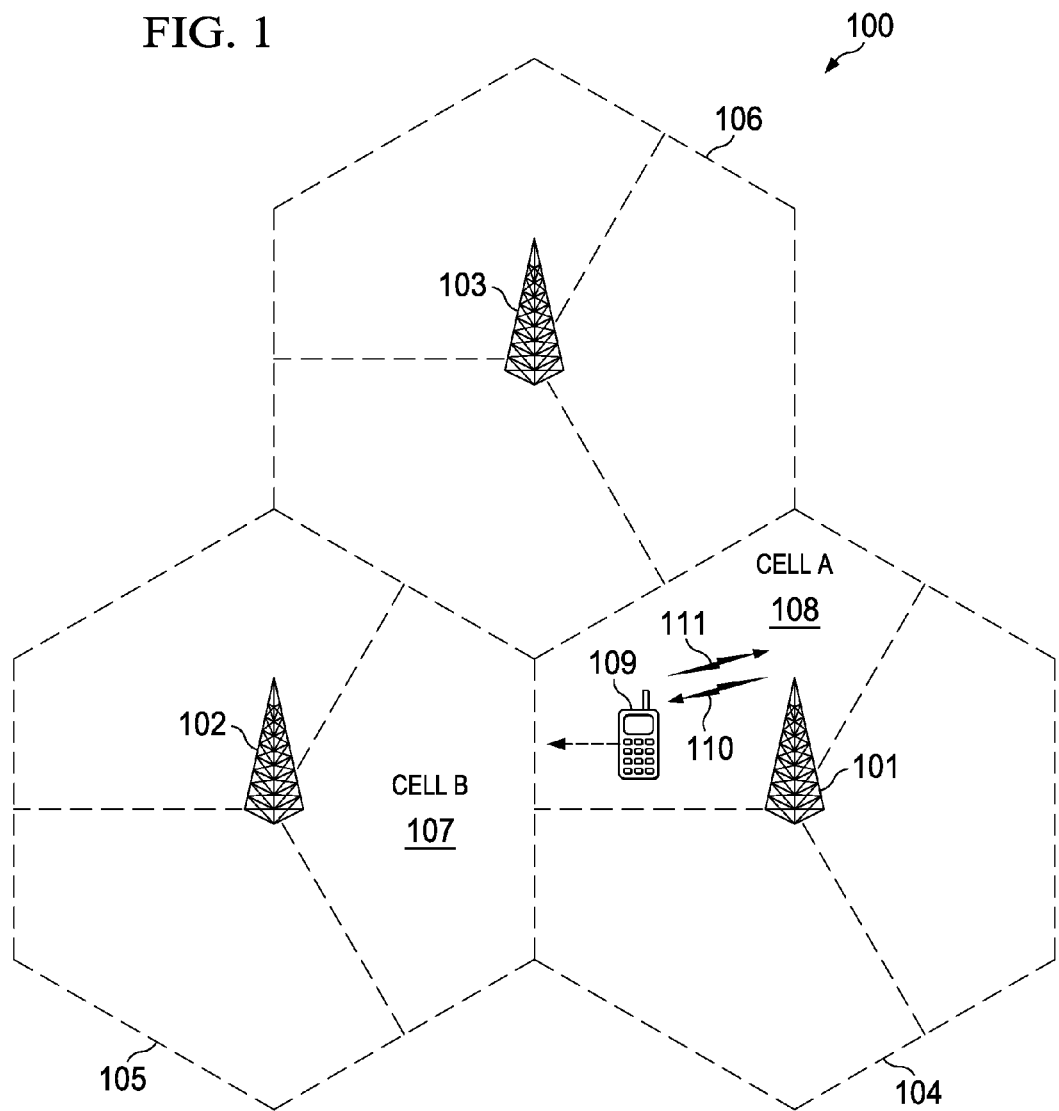
FIG. 1 is a diagram of a communication system of the present invention having three cells.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Figure 2:
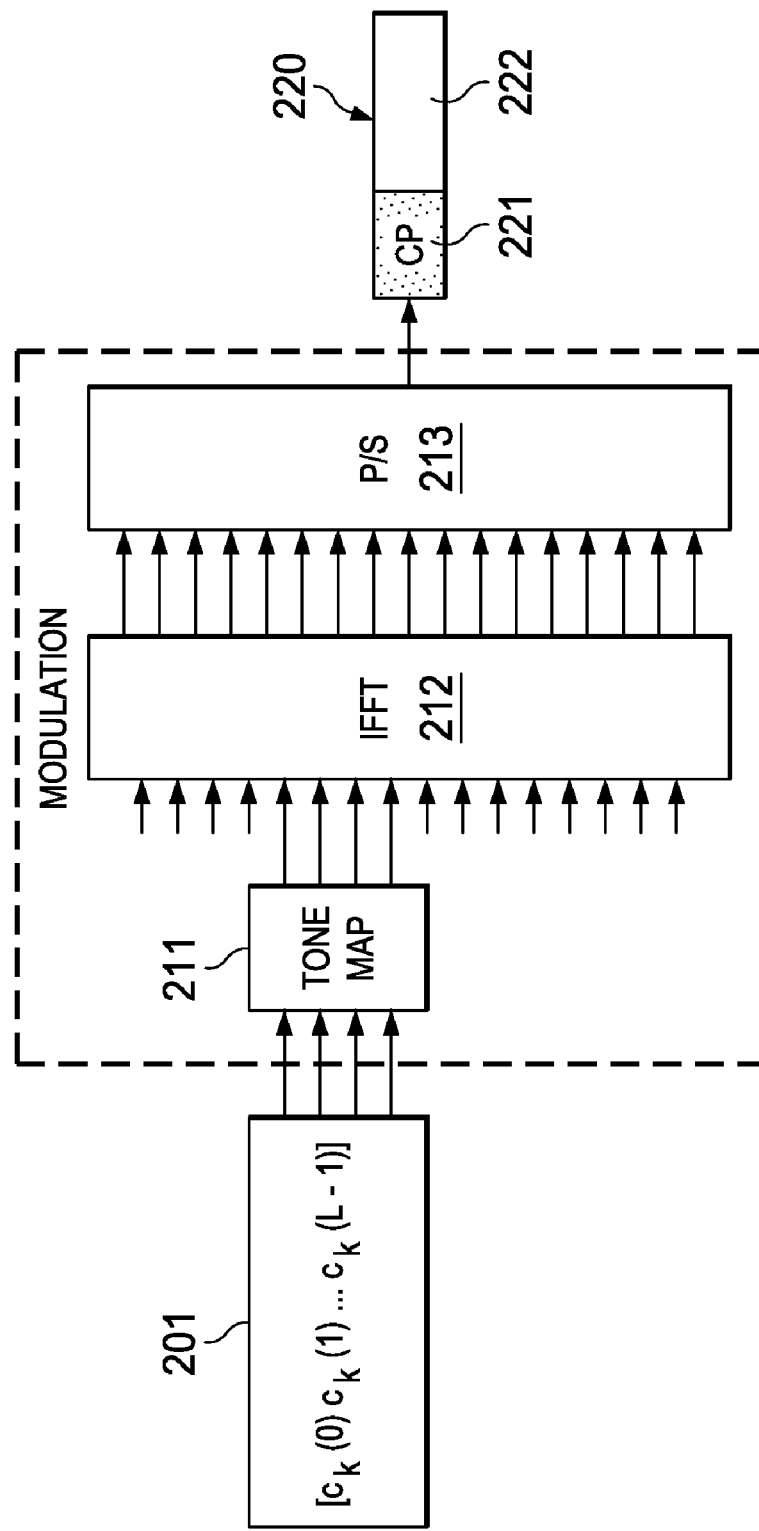
FIG. 2 is a block diagram of a first embodiment of a modulation block suitable for use in this invention.

FIG. 2 illustrates a block diagram of the modulation of an orthogonal frequency-division multiplexed access (OFDMA) system. Block $[c_k(0) \ldots c_k(L-1)]$ 201 denotes the user signal of user k. This user signal includes but not limited to reference signal, data signal, control signal, and random access pre-amble. Modulation block 210 includes tone map 211, inverse Fast Fourier transform (IFFT) block 212 and parallel-to-serial (P/S) converter 213. Tone map 211 maps the user signal onto L sub-carriers in the frequency domain. IFFT block 212 converts these signals from frequency domain to temporal domain. FIG. 2 contemplates that modulator 210 services a plurality of UEs. The plural signals from the plural UEs are transmitted on different sub-carriers at the same time period as designated by a UE specific tone map. These plural user signals and tone maps 211 are omitted for clarity. P/S converter 213 converts these parallel signals into a single serial signal. Block 220 inserts a cyclic prefix (CP) 221 to be transmitted with the data 222.

Figure 3:
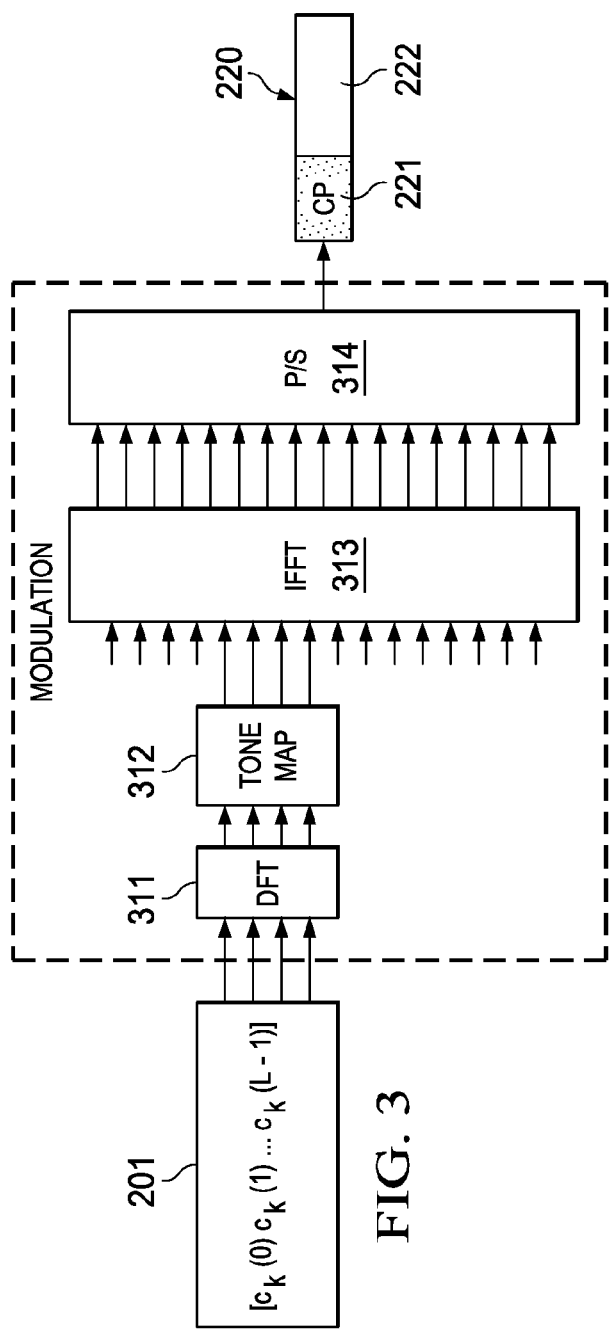
FIG. 3 is a block diagram of a second embodiment of a modulation block suitable for use in this invention.

FIG. 3 illustrates an alternate modulation to that of FIG. 2. Block $[c_k(0) \ldots c_k(L-1)]$ 201 denotes the user signal of user k. This user signal includes but not limited to reference signal, data signal and control signal. Modulation block 310 includes discrete Fourier Transform (DFT) block 311, tone map 312, inverse Fast Fourier transform (IFFT) block 313 and parallel-to-serial (P/S) converter 314. In FIG. 3, the user signal is first processed by DFT block 311. Tone map 312 maps the user signal onto L sub-carriers as described above in conjunction with FIG. 2. IFFT block 313 converts these signals from frequency domain to temporal domain. FIG. 3 contemplates that modulator 310 services a plurality of UEs. The plural signals from the plural UEs are transmitted on different subcarriers at the same time period as designated by a UE specific tone map. These plural user signals, DFT blocks 311 and tone maps 312 are omitted for clarity. P/S converter 314 converts these parallel signals into a single serial signal. Block 220 inserts a cyclic prefix (CP) 221 to be transmitted with the data 222.

Figure 4:
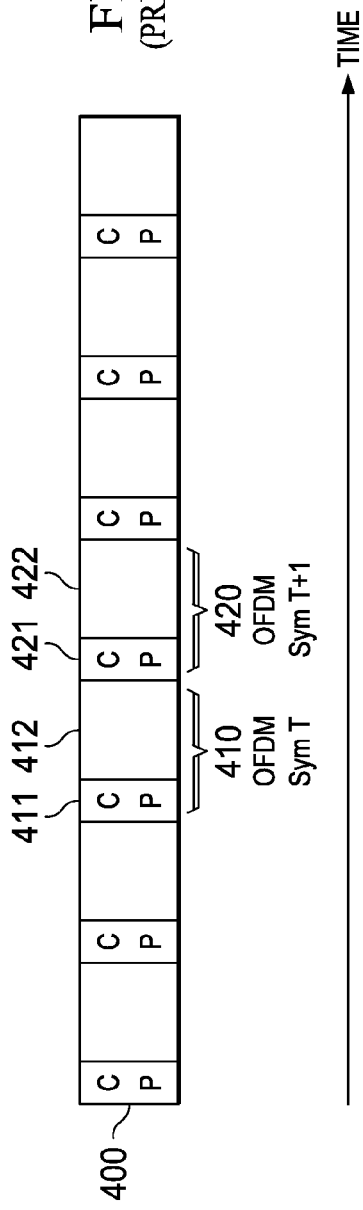
FIG. 4 is a schematic view of orthogonal frequency division multiplexing time slots.

FIG. 4 shows schematically OFDM symbols in time domain in accordance with the transmission technique applicable to this invention. Time data stream 400 at a particular one of the orthogonal frequencies includes plural time slots. Time slot (Sym T) 410 includes CP 411 and data 412 assembled as taught above in conjunction with FIGS. 2 and 3. The next time slot (Sym T+1) 420 includes CP 421 and data 422. In accordance with the transmission system applicable to this invention, the data of Sym T+1 420 may differ from the data of earlier Sym T 410, or these symbols include the same data for transmission redundancy. FIG. 4 illustrates the time domain stream 400 applicable to one of the orthogonal frequencies of the transmission protocol. Other time domain data streams similar to time domain stream 400 are applicable to the other orthogonal frequencies.

Figure 5:
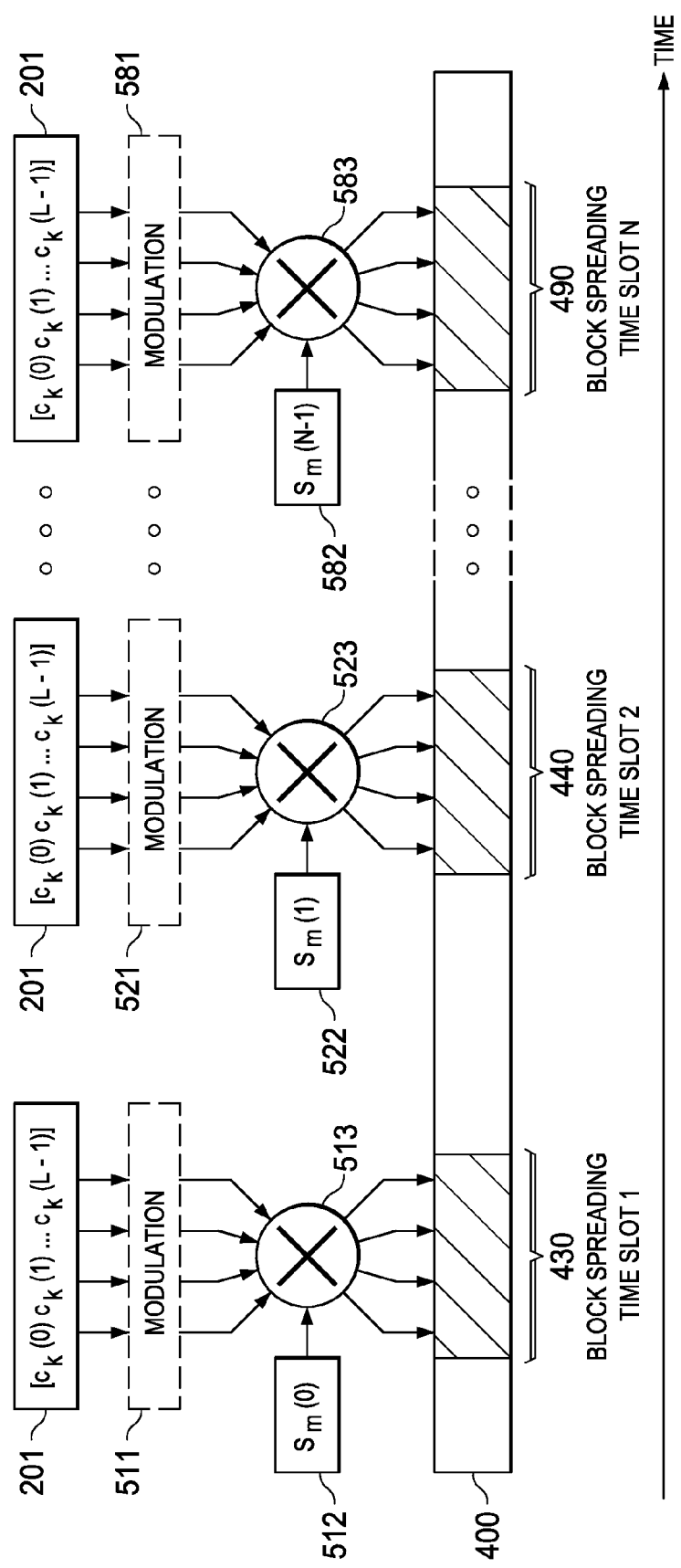
FIG. 5 is a schematic view of block spreading processing in orthogonal frequency division multiplexing time slots.

FIG. 5 schematically illustrates a technique called block spreading described in co-pending U.S. patent application Ser. No. 11/627,035 entitled "METHOD AND APPARATUS FOR INCREASING THE NUMBER OF ORTHOGONAL SIGNALS USING BLOCK SPREADING" filed Jan. 25, 2007, now U.S. Pat. No. 8,005,153 (claiming priority from U.S. Provisional Patent Application No. 60/762,071 filed Jan. 25, 2006) applied to orthogonal frequency division multiplexing access (OFDMA) system. FIG. 5 illustrates an OFDMA system with block spreading, where user signal $[c_k(0) \ldots c_k(L-1)]$ is transmitted in N OFDM time slots in time stream 400 with a block spreading code of length N. The block spreading code is denoted as $[s_m(0), s_m(1) \ldots s_m(N-1)]$ for the user equipment m. Note in the preferred embodiment a different block spreading code is assigned to each user equipment in any one cell 104, 105 and 106. The block spreading codes are orthogonal to each transmitting UE in a cell, therefore, allowing concurrent transmission of multiple UEs at the same time frequency resource without inter-user interference.

For each OFDMA time slot user signal $[c_k(0) \ldots c_k(L-1)]$ 201 is modulated in respective modulation blocks 511, 521 . . . 581. This modulation can be the OFDMA modulation block illustrated in FIG. 2 or the single-carrier OFDMA modulation block shown in FIG. 3. Other OFDM related modulation blocks are possible including but not limited to OFDM, DFT-spread OFDM, single-carrier OFDM and DFT-spread OFDMA. For the nth (for n=1 to N) OFDM time slot where block spreading is applied for the particular UE 109, the modulated signals are multiplied by a common scale $s_m(n-1)$ (512, 522 . . . 582) in respective multipliers 513, 523 . . . 583. The number of transmissions N can be any plural number. This processing results in a time stream 400 including block spreading time slots 430, 440 . . . 490. These N OFDM time slots may be discontinuous in time as shown in FIG. 5 or they may be sequential and continuous in time. If these N OFDM time slots are discontinuous the time intervals between these time slots are not necessarily equal.

Figure 6:
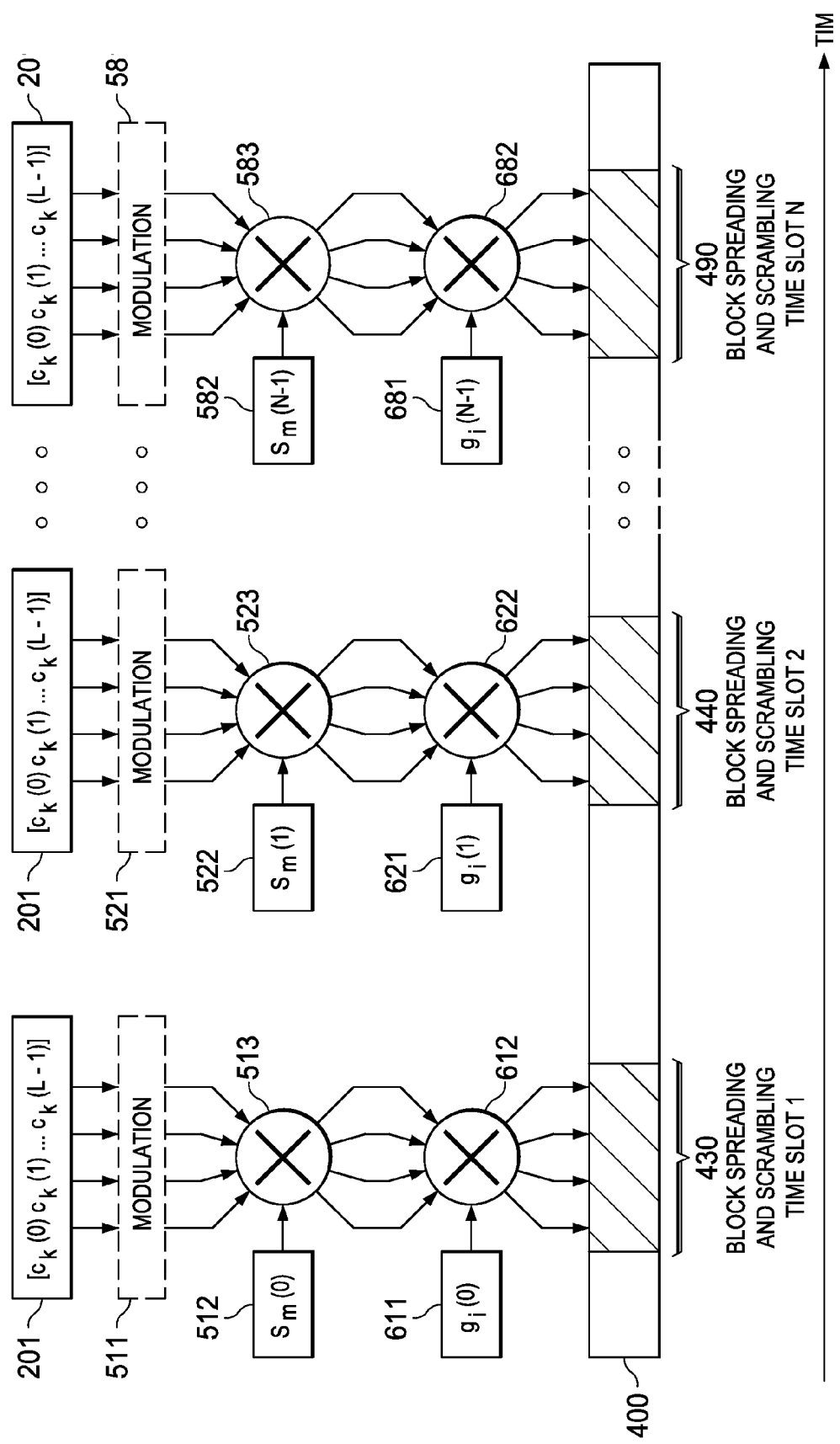
FIG. 6 is a schematic view of a first embodiment of combined block scrambling and block spreading processing in orthogonal frequency division multiplexing time slots according to this invention.

FIG. 6 schematically illustrates one embodiment of the block scrambling for OFDMA systems of this invention. The block scrambling code is designated as $[g_i(0), g_i(1), \ldots g_i(N-1)]$ for cell i. For each OFDMA time slot user signal $[c_k(0) \ldots c_k(L-1)]$ 201 is modulated in respective modulation blocks 511, 521 . . . 581 as previously described. For the nth (for n=1 to N) OFDM time slot where block spreading is applied for the particular UE 109, the modulated signals are multiplied by a common scale $s_m(n-1)$ (512, 522 . . . 582) in respective multipliers 513, 523 . . . 583. For the nth (for n=1 to N) OFDM time slot where block spreading is preferably applied for the particular cell, the modulated signals are multiplied by a common scale $g_i(n-1)$ (611, 621 . . . 681) in respective multipliers 612, 622 . . . 682. Transmission of the block-scrambled signals can be contiguous or non-contiguous in time. FIG. 6 illustrates a non-contiguous, but the block scrambling of this invention can be applied to contiguous OFDM symbols in the time domain. Further, non-contiguous transmissions need not have the same time interval spacing.

In a multi-cell OFDMA system, inter-cell interference is typically the dominant factor that influences the system performance such as cell average throughput or cell edge throughput. The block spreading OFDMA system shown in FIG. 5 provides minimal intra-cell interference by orthogonally separating the signals from a plurality of UEs with UE specific orthogonal block spreading code. The preferred embodiment of this invention employs a similar technique to combat inter-cell interference. Consider the case of two UEs 109 of adjacent cells, each located near the common cell boundary. Since the UEs 109 in this case are in differing cells, they may have the same block spreading code. Without further mechanism for inter-cell interference randomization, the interference UEs 109 observe from each other are largely identical, on the N time slots over which block spreading is applied. Block scrambling in the preferred embodiment of this invention is cell specific. In other words, difference cells assign different block scrambling codes $[g_i(0), g_i(1), \ldots g_i(N-1)]$ to its serving UEs. Therefore, cell specific block scrambling codes decorrelates signals from these UEs 109 and randomizes inter-cell interference over a plurality of time slots.

Figure 7:
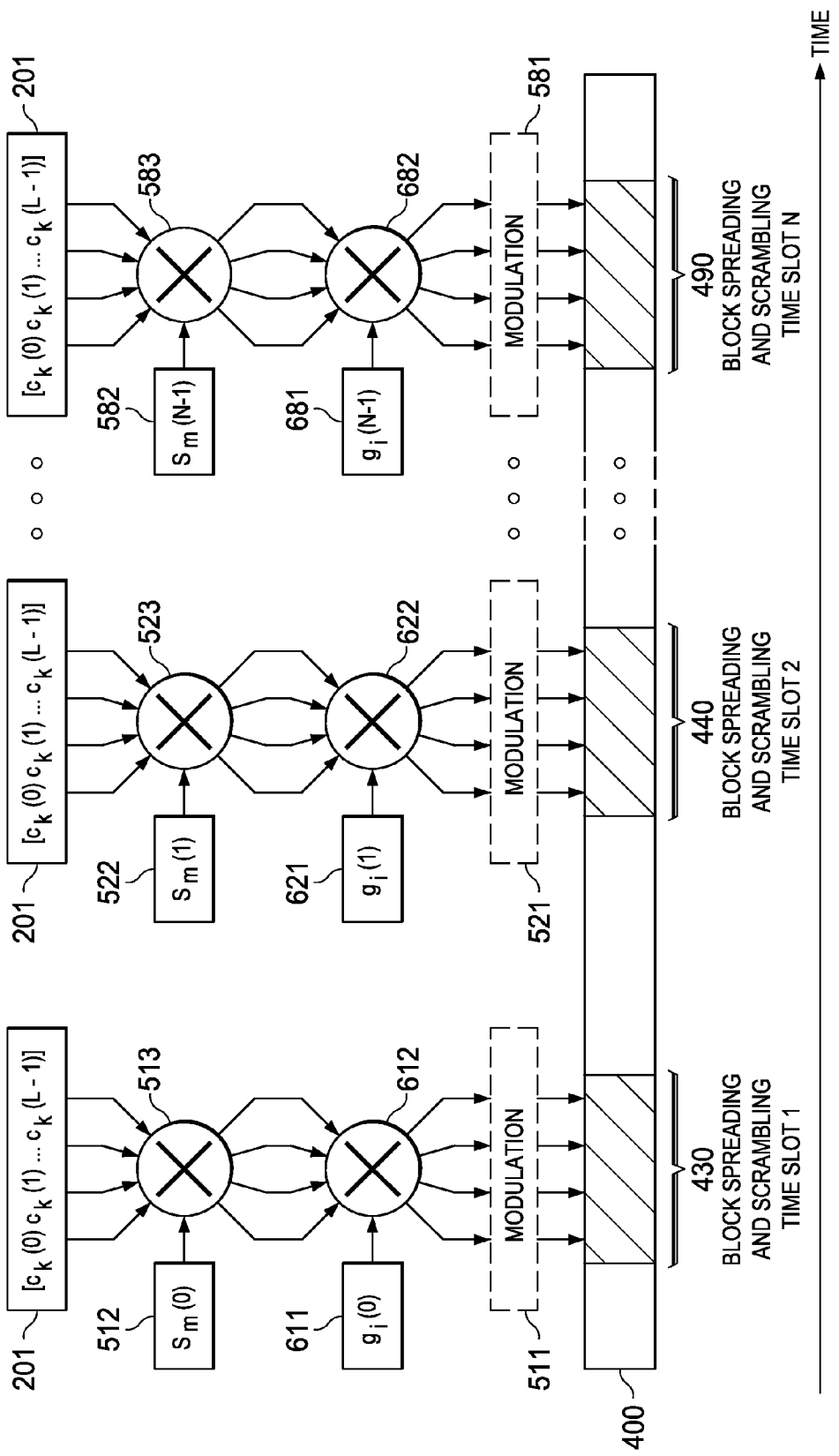
FIG. 7 is a schematic view of a second embodiment of combined block scrambling and block spreading processing in orthogonal frequency division multiplexing time slots according to this invention.
Figure 8:
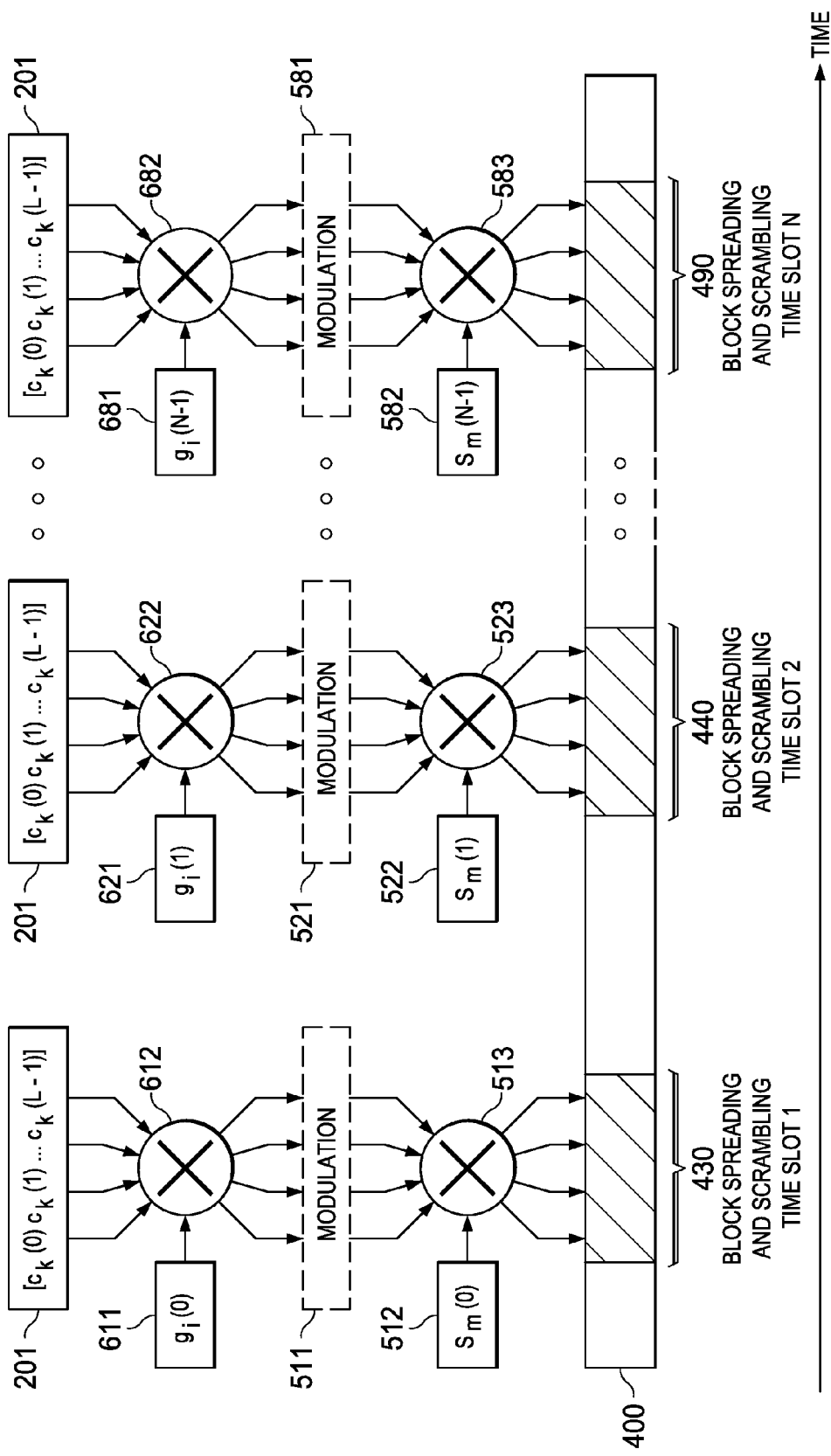
FIG. 8 is a schematic view of a third embodiment of combined block scrambling and block spreading processing in orthogonal frequency division multiplexing time slots according to this invention.

FIGS. 7 and 8 illustrate alternative embodiments of this invention. Note that $g_i(n)$ is a common factor to all samples in one OFDM symbol. Thus, it can be multiplied to the signal before or after the modulation blocks 511, 521 . . . 581. This is illustrated in FIG. 7 where respective multipliers 612, 622 . . . 682 multiply the user signal $[c_k(0) \ldots c_k(L-1)]$ 201 before modulation blocks 511, 521 . . . 581. Further, the order of applying $s_m(n)$ and $g_i(n)$ to an OFDM symbol is exchangeable. FIG. 8 illustrates another alternate embodiment where the multiplication of respective multipliers 612, 622 . . . 682 occurs between multiplication in respective multipliers 513, 523 . . . 583 and the modulation of respective modulation blocks 511, 521 . . . 581. In fact the modulation and multiplications are commutative and can be performed in any order.

In the preferred embodiment the block scrambling code is common to all users in one cell. Substantial advantageous decorrelation results from cell specific block scrambling codes. Each UE 109 can obtain the block scrambling code from its serving cell through the broadcast channel or the control channel. The block scrambling sequence should have a length equal to or greater than the number of repeat time periods. The block scrambling codes can be any sequences, but preferably are constant amplitude sequences where the absolute value of $g_i(n)$ is the same (for n=1, 2 . . . N). In particular, a block scrambling sequence may be any pseudo random sequence, e.g. the m-sequence. Other embodiments of block scrambling codes are Hadamard codes, DFT codes and CAZAC sequences. CAZAC sequences are complex valued sequences with following properties: 1) Constant Amplitude (CA); and 2) Zero Cyclic Autocorrelation (ZAC).

Examples of CAZAC sequences include but are not limited to: Chu Sequences; Frank-Zadoff Sequences; Zadoff-Chu (ZC) Sequences; and Generalized Chirp-Like (GCL) Sequences.

Zadoff-Chu (ZC) sequences are defined by:

$$a_M(k)=\exp[j2\pi(M/N)[k(k+1)/2+qk]] \text{ for } N \text{ odd}$$

$$a_M(k)=\exp[j2\pi(M/N)[k^2/2+qk]] \text{ for } N \text{ even}$$

where: N is the length of the sequence; M is the index of the root ZC sequence with M and N being relatively prime; q is any fixed integer; and k is the index of the sequence element ranging from 0 to N−1. These are representative examples of CAZAC sequences. An alternative convention for ZC definition replaces j in the above formula by −j. Either convention can be adopted. In the above formula, making N a prime number maximizes the set of non-orthogonal root ZC sequences having optimal cross-correlation. When N is prime, there are (N−1) possible choices for M. Each such choice results in a distinct root ZC CAZAC sequence. Block scrambling sequence hopping is also possible within a cell or among cells.

The length of the block scrambling code is not necessary the same as the length of the block spreading code. Further, block scrambling can be applied to OFDMA systems without block spreading. In OFDMA systems, block scrambling can be applied to the transmission of any signals such as the reference signal, user data signals, acknowledge signals, channel quality indicator signals and random access preambles.

The block scrambling method of this invention can be applied to OFDMA, OFDM, FDMA, DFT-spread OFDM, DFT-spread OFDMA, single-carrier OFDMA (SC-OFDMA), and single-carrier OFDM (SC-OFDM) systems. These versions of FDM transmission strategies are not mutually exclusive, since, for example, single-carrier FDMA (SC-FDMA) may be realized using the DFT-spread OFDM technique. In addition, embodiments of the invention also apply to general single-carrier systems.

The block scrambling method of this invention applies to both downlink and uplink transmissions. In a downlink transmission, a common transmitter or base station communicates to multiple UEs at the same time slot, while separating different UEs signal on mutually orthogonal sub-carriers in frequency domain. In downlink transmission, block spreading enables the base station to communicate to plural UEs at the same time frequency resource. In an uplink transmission, a plurality of UEs are communicating to a common receiver or base station in a time slot, on mutually orthogonal sub-carriers in frequency domain. In uplink transmission, block spreading enables a plurality of UEs to communicate to a base station on the same time frequency resource. The block scrambling method of this invention applies to both downlink and uplink transmissions, in additional to or independent of block spreading.

The block scrambling code can be receiver specific or transmitter specific. For example, in uplink transmission, each receiver or base station has a specific block scrambling sequence. In downlink transmission, the base station applies a common block scrambling sequence to signal transmission of its serving UEs. Both scenarios result to cell specific block scrambling code per base station.

Figure 9:
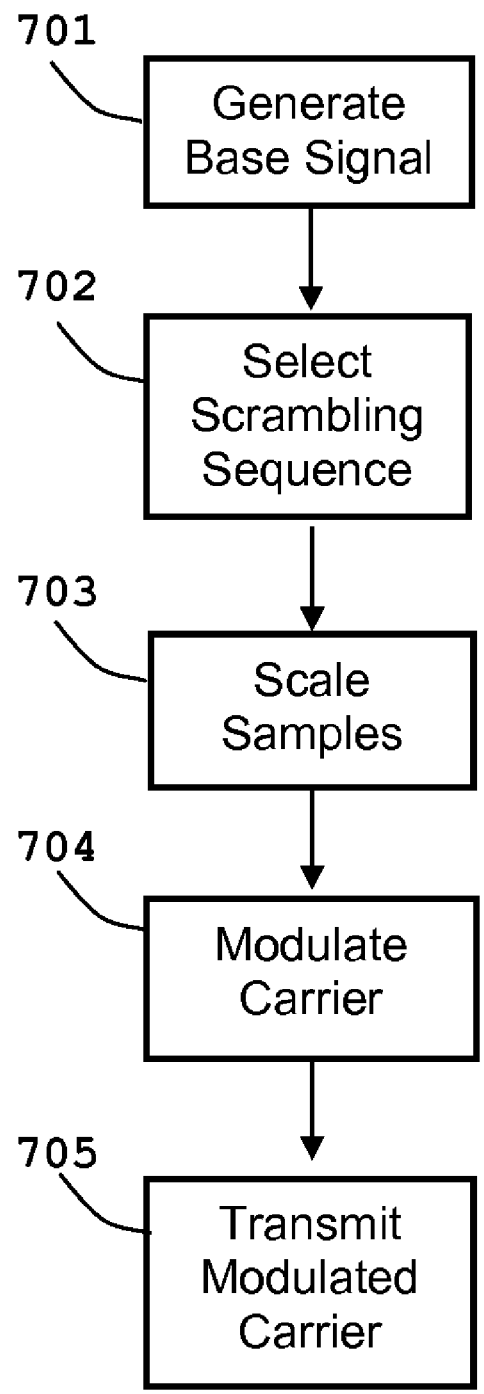
FIG. 9 is a flow chart illustrating the steps of this invention.

FIG. 9 illustrates method of transmitting signals in a communication system over at least two time periods of this invention. Block 701 generates a base signal including at least two samples in each time period. Block 702 selects a scrambling sequence of length equal to or greater than the number of time periods. Block 703 scales all samples in the signal in a time period with one element of the scrambling sequence and transmitting the scaled signal in the time period. Block 704 modulates the scrambled and scales base signal on a radio frequency carrier. Block 705 transmits the modulated radio frequency carrier.

What is claimed is:

1. A method of transmitting radio frequency signals in a communication system over at least two time periods, comprising the steps of:
   generating a base signal comprising of at least two samples in each time period;
   selecting a scrambling sequence of length equal to or greater than the number of time periods;
   scaling all samples in said signal in a time period with one common element of said scrambling sequence;
   modulating the scaled signal onto a radio frequency carrier; and
   transmitting the radio frequency carrier modulated by the scaled signal in said time period.

2. The method of claim 1, wherein:
   said signal in each time period is obtained by scaling said base signal.

3. The method of claim 1, wherein:
   said scrambling sequence is a constant amplitude zero auto-correlation sequence.

4. The method of claim 1, wherein:
   said scrambling sequence is a pseudo-random sequence.

5. The method of claim 1, wherein:
   said step of scaling all samples in said signal in a time period consists of multiplying all samples of said signal with an element of said scrambling sequence.

6. The method of claim 1, wherein:
   said step of scaling all samples in said signal in a time period consists of scaling said signal in a nth time period with an nth element of said scrambling sequence.

7. The method of claim 1, wherein:
   said scrambling sequence is transmitter specific.

8. The method of claim 1, wherein:
   said scrambling sequence is receiver specific.

9. The method of claim 1, wherein:
   said time periods are consecutive in time domain.

10. The method of claim 1, wherein:
    said time periods are discontinuous in time domain.

11. The method of claim 1, wherein:
    said base signal is a reference signal.

12. The method of claim 1, wherein:
    said base signal is a control signal.

13. The method of claim 1, wherein:
    said base signal is a data signal.

14. The method of claim 1, wherein:
    said base signal is an acknowledge signal.

15. The method of claim 1, wherein:
    said base signal is a channel quality indicator signal.

16. The method of claim 1, wherein:
    said base signal is a random access preamble.

17. The method of claim 1, wherein:
    said signal in each time period is the same.

18. The method of claim 1, wherein:
    said step of generating said base signal conforms to an orthogonal frequency-division multiplexed access (OFDMA) specification.

19. The method of claim 1, wherein:
    said step of generating said base signal conforms to a single-carrier orthogonal frequency-division multiplexed access (SC-OFDMA).

20. The method of claim 1, wherein:

said step of generating said base signal conforms to a discrete Fourier Transform orthogonal frequency-division multiplexed access (DFT-OFDMA) specification.

21. The method of claim 1, wherein:

said step of generating said base signal conforms to an orthogonal frequency-division multiplexed (OFDM) specification.

22. The method of claim 1, wherein:

said step of generating said base signal conforms to a single-carrier orthogonal frequency-division multiplexed (SC-OFDM) specification.

23. The method of claim 1, wherein:

said step of generating said base signal conforms to a discrete Fourier Transform orthogonal frequency-division multiplexed (DFT-OFDM) specification.

24. The method of claim 3, wherein:

said step of selecting a scrambling sequence selects a Zadoff-Chu sequence.

* * * * *